United States Patent [19]

Perry et al.

[11] Patent Number: 4,594,713
[45] Date of Patent: Jun. 10, 1986

[54] REMOTE DATA LINK RECEIVE DATA REFORMATTER

[75] Inventors: Thomas J. Perry, Phoenix; Muhammad I. Khera, Glendale, both of Ariz.

[73] Assignee: GTE Automatic Electric Inc., Northlake, Ill.

[21] Appl. No.: 564,135

[22] Filed: Dec. 22, 1983

[51] Int. Cl.[4] .......................................... G06F 11/00
[52] U.S. Cl. ...................................... 371/49; 371/50
[58] Field of Search ...................... 371/49, 50, 51, 52; 370/43; 364/200, 900

[56] References Cited

U.S. PATENT DOCUMENTS

| | | | |
|---|---|---|---|
| 3,648,256 | 3/1972 | Paine et al. | 371/49 |
| 3,711,829 | 1/1973 | Lubrano | 371/49 |
| 3,831,144 | 8/1974 | En | 371/50 |
| 3,909,782 | 9/1975 | Mazier | 371/49 |
| 3,914,741 | 10/1975 | Bonser et al. | 371/49 |
| 4,103,288 | 7/1978 | Westman | 371/49 |
| 4,197,523 | 4/1980 | Philip | 371/49 |
| 4,433,388 | 2/1984 | Oosterbaan | 371/49 |

Primary Examiner—Michael R. Fleming
Attorney, Agent, or Firm—Anthony Miologos; Peter Xiarhos

[57] ABSTRACT

A receive data reformatter for a telecommunications switching system is shown for disassembling a data message to a plurality of 8-bit data bytes. The receive data reformatter is comprised of a parallel to serial converter which receives the data message one byte at a time which it subsequently outputs serially. A horizontal parity check circuit receives the serial data and is arranged to output an error signal when an error in parity is detected. A serial to parallel converter, connected to the serial output of the parallel to serial converter, receives the serial data and assembles the serial data into parallel form. A write buffer connected to the serial to parallel converter receives the assembled parallel data when eight data bits have been accumulated in the serial to parallel converter. The thus formed data byte is output to a peripheral processor of the telecommunications switching system.

8 Claims, 9 Drawing Figures

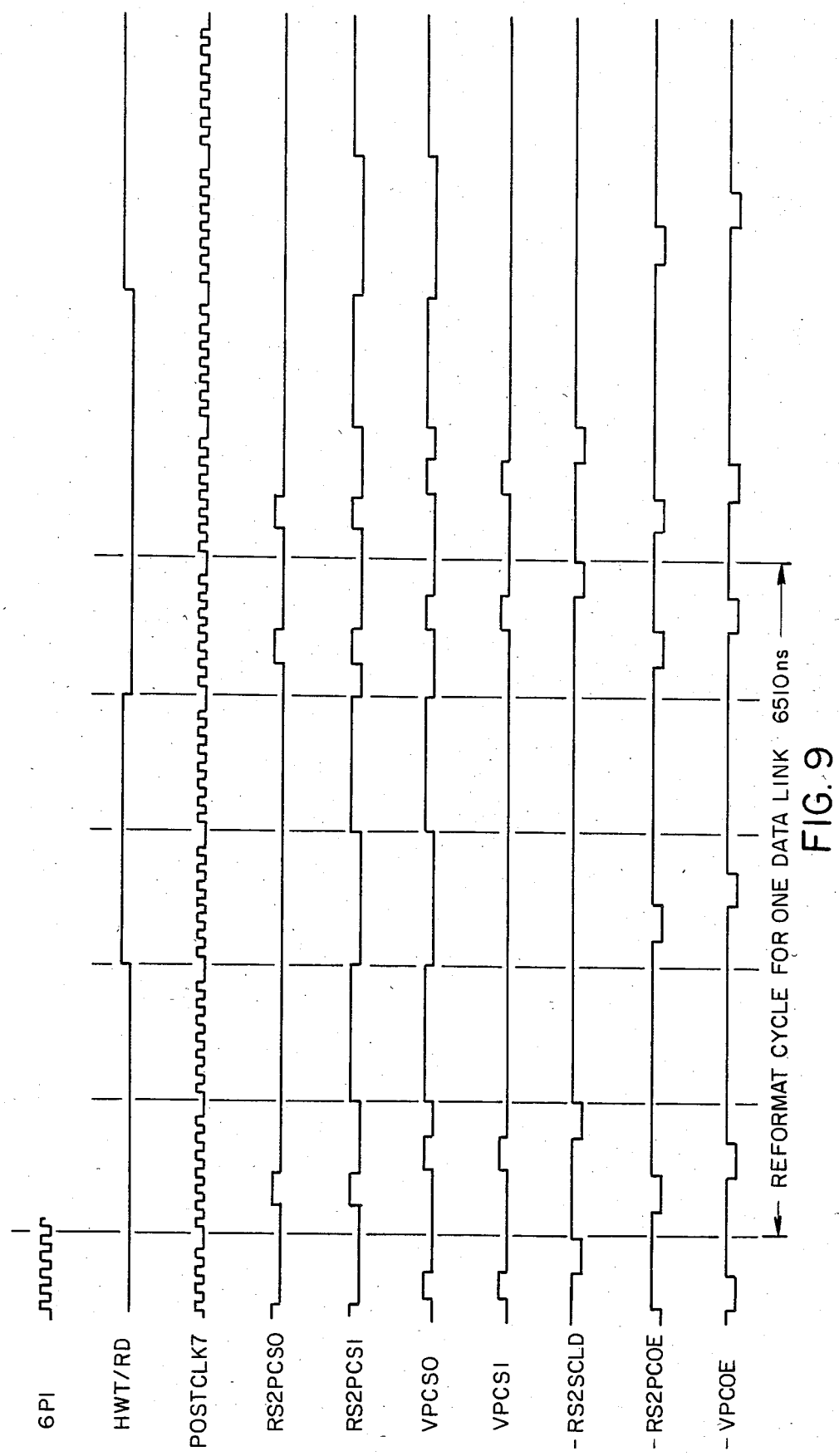

REMOTE DATA LINK RECEIVE DATA REFORMATTER

CROSS-REFERENCE TO RELATED APPLICATIONS

The present application is related to the following co-pending U.S. Patent applications all having the same inventive entity and being assigned to the same assignee:

U.S. patent application Ser. No. 564,134, titled, "A Remote Data Link Controller;"

U.S. patent application Ser. No. 564,138, titled, "A Remote Data Link Controller Having a Multiple Data Link Handling Capabilities;"

U.S. patent application Ser. No. 564,133, titled, "A Remote Data Link Transmit Data Formatter;"

U.S. patent application Ser. No. 564,136, titled, "A Remote Data Link Address Sequencer and Memory Arrangement for Accessing and Storing Digital Data;"

U.S. patent application Ser. No. 564,137, titled, "A Data Format Arrangement for Communication Between the Peripheral Processors of a Telecommunications Switching Network."

BACKGROUND OF THE INVENTION

The present invention relates in general to data transmission between the switching systems of a telecommunication network and more particularly to an arrangement for reformatting received control data.

In modern digital telecommunication switching systems a concept of network modularity has been designed allowing the interconnection of small switching systems remote to a larger host system. These remote switching systems have capacities to handle between a few hundred and a few thousand telephone subscribers. The remote switching systems are normally used in areas where the installation of a large switching system would be uneconomical.

A high speed digital data link typically interfaces the host switching system to the remote system through which large amounts of voice and control data are exchanged. The voice data normally comprises subscriber calls switched through either the host or the remote system. The control data may be status exchanges between the host and the remote, i.e. centralized administration, billing and maintenance, or the direct control of the operation of the remote by the host.

The control data exchanges are originated in the sending system peripheral processor transmitted over the high speed digital data link to the receiving system peripheral processor where the data is interpreted. In order to relieve each peripheral processor from the burden of controlling the data link a remote data link controller is implemented in each system which performs all tasks involved in the formatting, transmission and reception of the control data.

The remote data link controllers are connected to each other via digital spans. These digital spans may be T1, T2 or T1C, T3 carriers using DS1, DS2 or DS1C, DS3 data formats, respectively. These digital spans transmit data at high speeds serially at a rate of approximately 1.5–45 megabits per second.

Typically the transmitting peripheral processor outputs data words to the link controller where the data words are assembled or formatted into a data message or packet. The packet is then transmitted to the receiving link controller where the data message is reformatted back into data words, readable by the receiving peripheral processor.

Accordingly, it becomes the object of the present invention to provide an efficient data link receive reformatter for translation of data messages to data words.

SUMMARY OF THE INVENTION

In accomplishing the object of the present invention there is provided a receive data reformatter for disassembling a data message containing a plurality of message bytes into a plurality of 8-bit data bytes. The receive data reformatter of the present invention is used in a telecommunications switching system which includes a peripheral processor, an input buffer arranged to receive and store the data bytes and a temporary memory.

The receive data reformatter of the present invention is comprised of a parallel to serial converter connected to the temporary memory and arranged to receive a message byte from the temporary memory in parallel form and output the message byte serially. The serial output of the parallel to serial converter is applied to a horizontal parity check circuit which receives the serial data and outputs an error signal when an error in horizontal parity is detected. Serial data is also input to a serial to parallel converter where the serial data is assembled into parallel form.

A write buffer connected to the output of the serial to parallel converter receives the assembled parallel data when eight bits of data have been assembled from the message bytes by the serial to parallel converter. These eight bits of data comprise a data byte which the write buffer transfers to the input buffer and onto the peripheral processor.

During the reformatting process any bits of a message byte remaining in the serial to parallel converter are transferred to the temporary memory, where they are stored until the next reformatting cycle.

At this time the remaining bits are returned to the serial to parallel converter and a second message byte is transferred from the temporary memory to the parallel to serial converter. The parallel to serial converter then outputs the second message byte serially to the serial to parallel converter where the bits from the second message byte are added to the remaining bits in the serial to parallel converter. When eight bits have been accumulated, the now reformatted data byte is transferred to the write buffer. Again, any left over bits in the serial to parallel converter are brought out and stored in the temporary memory until the next reformatting cycle.

In this manner, 64 bits of data contained in ten message bytes are reformatted into eight 8-bit data bytes.

BRIEF DESCRIPTION OF THE DRAWINGS

FIG. 9 is a timing diagram showing the reformatting control signals used by the present invention.

DESCRIPTION OF THE PREFERRED EMBODIMENT

Figure 1:
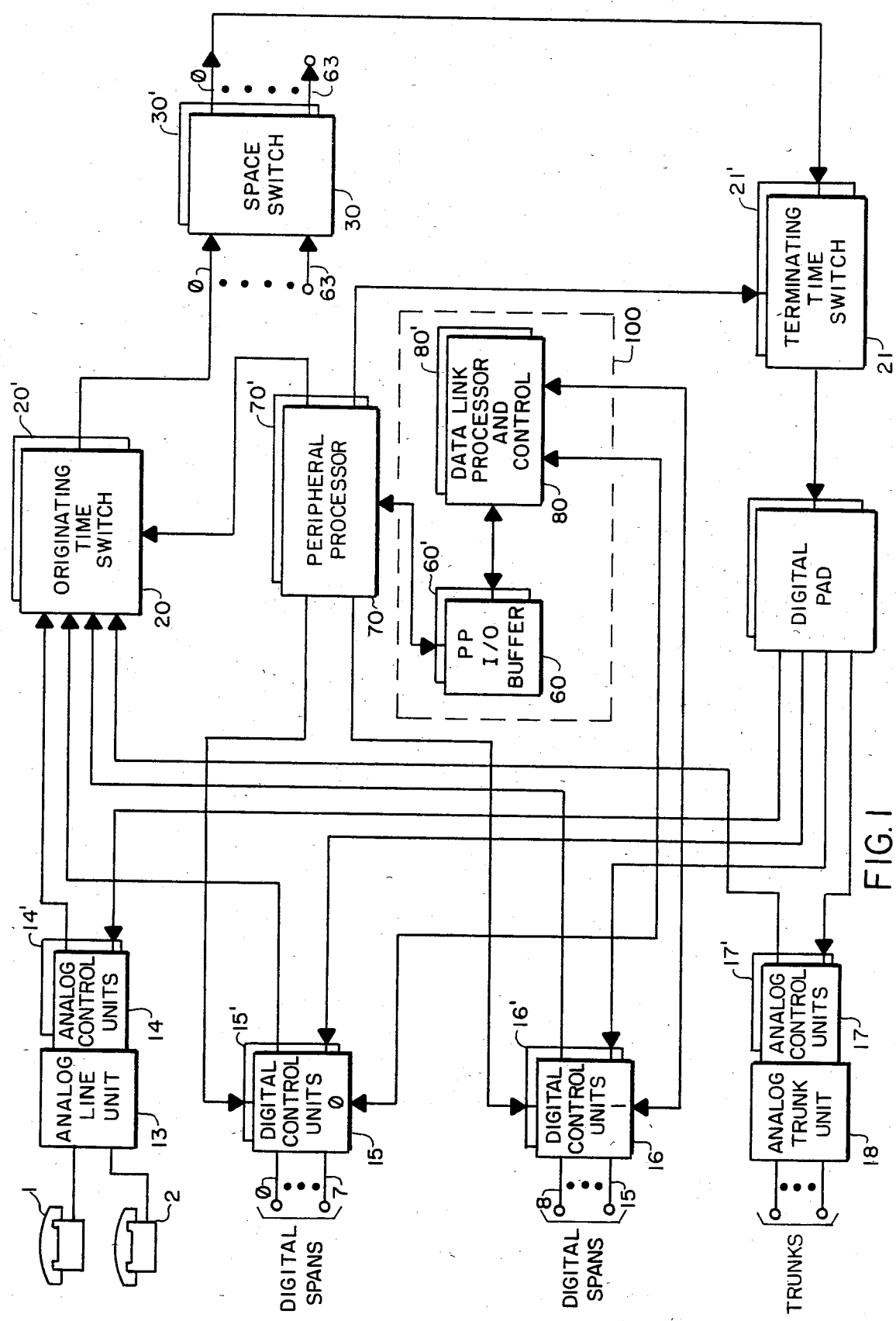
FIG. 1 is a block diagram of a telecommunications switching system which embodies the present invention.

Referring to FIG. 1, a time-space-time digital switching system along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to a duplex pair of space switch units 30 and 30' which are in turn connected to a duplex pair of terminating time switches 21 and 21'. Terminating time switches 21 and 21' are connected to analog control units 14 and 14' and ultimately to the telephone subscribers 1 and 2 via analog line circuit 13. Digital control units 15, 15' and 16, 16' connect the digital spans to the switching system. Digital span equipment may be implemented using a model 9004 T1 digital span, manufactured by GTE Lenkurt, Inc. Similarly, analog trunk unit 18 connects trunk circuits to the digital switching system via analog control units 17 and 17'.

A peripheral processor CPU 70 controls the digital switching system and digital and analog control units. Analog line unit 13 and a duplex pair of analog control units 14 and 14' interface to telephone subscribers directly. A duplicate pair of digital control units 15, 15' and 16, 16' control the incoming PCM data from the digital spans. Similarly, the analog trunk unit 18 and a duplex pair of analog control units 17 and 17' interface to trunk circuits. The analog and digital control units are each duplicated for reliability purposes.

The network of FIG. 1 also includes a REMOTE DATA LINK CONTROLLER (RDLC) 100 which provides formatting and control of data transmitted and received between the peripheral processors of two or more switching systems. The RDLC can provide up to 16, 64 kilobits per second data links arranged for full duplex operation and is configured so that it can provide one full duplex data link for each of the 16 T1 spans. RDLC 100 can operate together with one or two digital control units (DCU), with each DCU capable of providing up to eight T1 carrier facilities.

RDLC 100 includes a duplicated data link processor and control 80 and 80' and a duplicated peripheral processor (PP) I/O buffer 60 and 60'.

Prior to examining the detailed operation of the RDLC 100, it is helpful to understand the format and protocol of the messages which are transmitted and received by the RDLC. Each message consists of eight, 8-bit bytes of data for a total of 64 bits. The peripheral processor I/O buffer provides four transmit message buffers and four receive message buffers for each of the 16 possible data links.

Normally, peripheral processor software writes a message into a transmit message buffer of PP I/O buffer 60 and 60' associated with a data link and then issues a transmit command to data link processor and control 80 and 80'. The data link processor and control 80 and 80' responds by taking the message out of the transmit message buffer, formatting the data so that it can be transmitted over a T1 carrier and then transmits the message to the distant end of the data link through the appropriate DCU and digital span.

When a message is received, the data link processor and control 80 and 80' reformats the received data and places the message into an appropriate receive message buffer in the PP I/O buffer 60 and 60'. Data link processor and control 80 and 80' then causes an interrupt, alerting peripheral processor 70 and 70' to the fact that a message has been received. The RDLC will queue up to three received messages for each data link. It should be noted that under normal conditions the RDLC functions in a duplex configuration, that is, it matches all outgoing signals performed in the DCUs. With this arrangement there is one RDLC circuit for each of the two copies of the DCUs.

Figure 2:
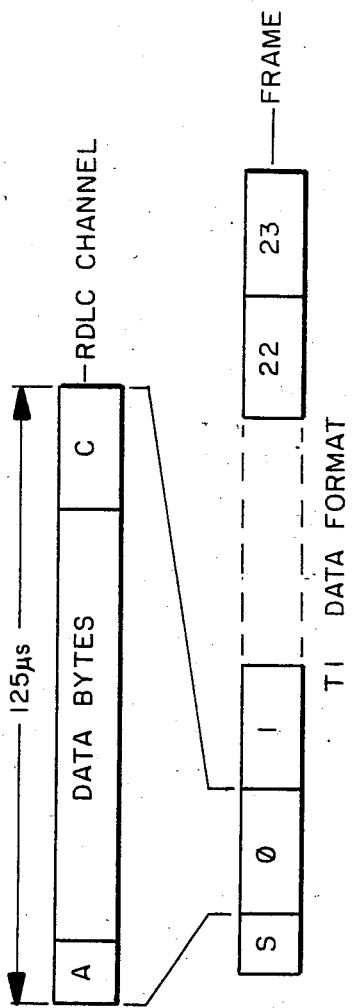
FIG. 2 is a bit map of a channel and frame of a T1 digital span.

The nature of a T1 data and its format is shown in FIG. 2. Normally, each T1 span transmits and receives voice samples organized together into a frame. Each frame includes 24 voice samples with each voice sample associated with one channel of voice (or data). The channels are numbered 0–23. Normally, the RDLC will insert its data bytes in channel 0. The S bit carries a periodic pattern which, when detected, is used to identify the beginning of each frame of data.

Figure 3:
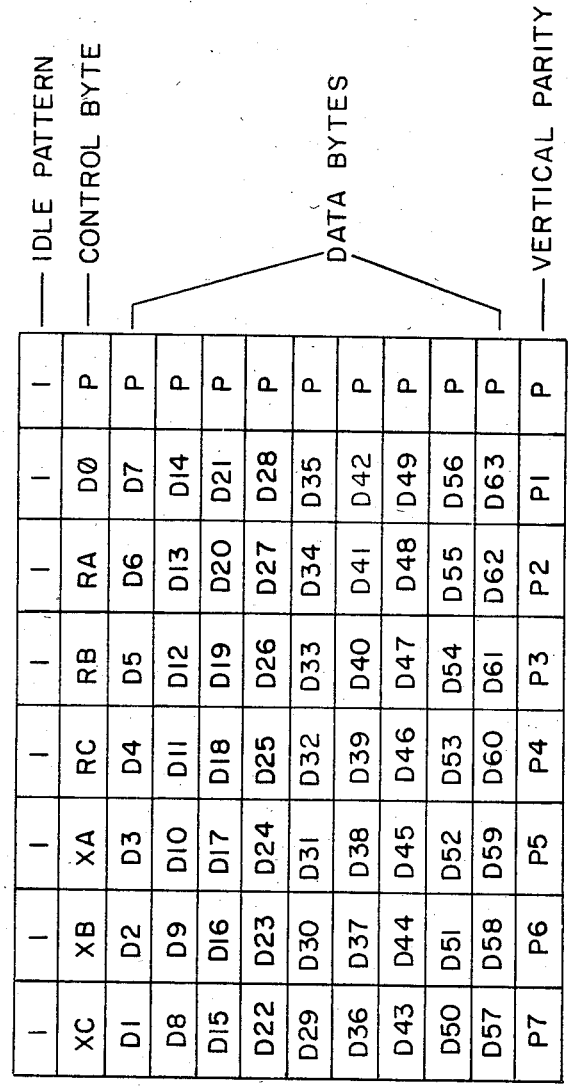
FIG. 3 is a bit map representation of a data control message.

Turning to FIG. 3, the complete data format for one message is shown. The data format is byte oriented with one 8-bit byte being transmitted during each T1 data frame for each data link. When the link is idle and not transmitting the transmitter sends idle patterns consisting of all ones. The beginning of a message is indicated by sending a control byte containing one or more zeros which may contain information conveying the sequence number of messages transmitted or received and/or acknowledgements between the RDLCs. As can be seen in FIG. 3 only six control bits are used (XC, XB, XA, RC, RB, RA) in the control byte. The first data bit to be transmitted is inserted in the bit 1 position of the control byte. The control byte further includes an odd parity bit in bit position 0. The next nine bytes contain the remaining 63 bits of data, each byte containing seven bits of data plus an odd parity bit. The final message byte contains seven vertical parity bits plus an odd parity bit for the vertical parity byte. Each vertical parity bit provides even parity for ten of the preceding bits, i.e. P1 for bit 1 in each of the preceding ten bytes, P2 for bit 2, P3 for bit 3, etc. The next byte will contain idle pattern.

It should be noted that the idle pattern is unique in that it has even parity. This makes it easy for the receiver to synchronize with the incoming data stream and greatly reduces the chance that a receiver would accept an incorrect message because of improper synchronization.

Figure 4:
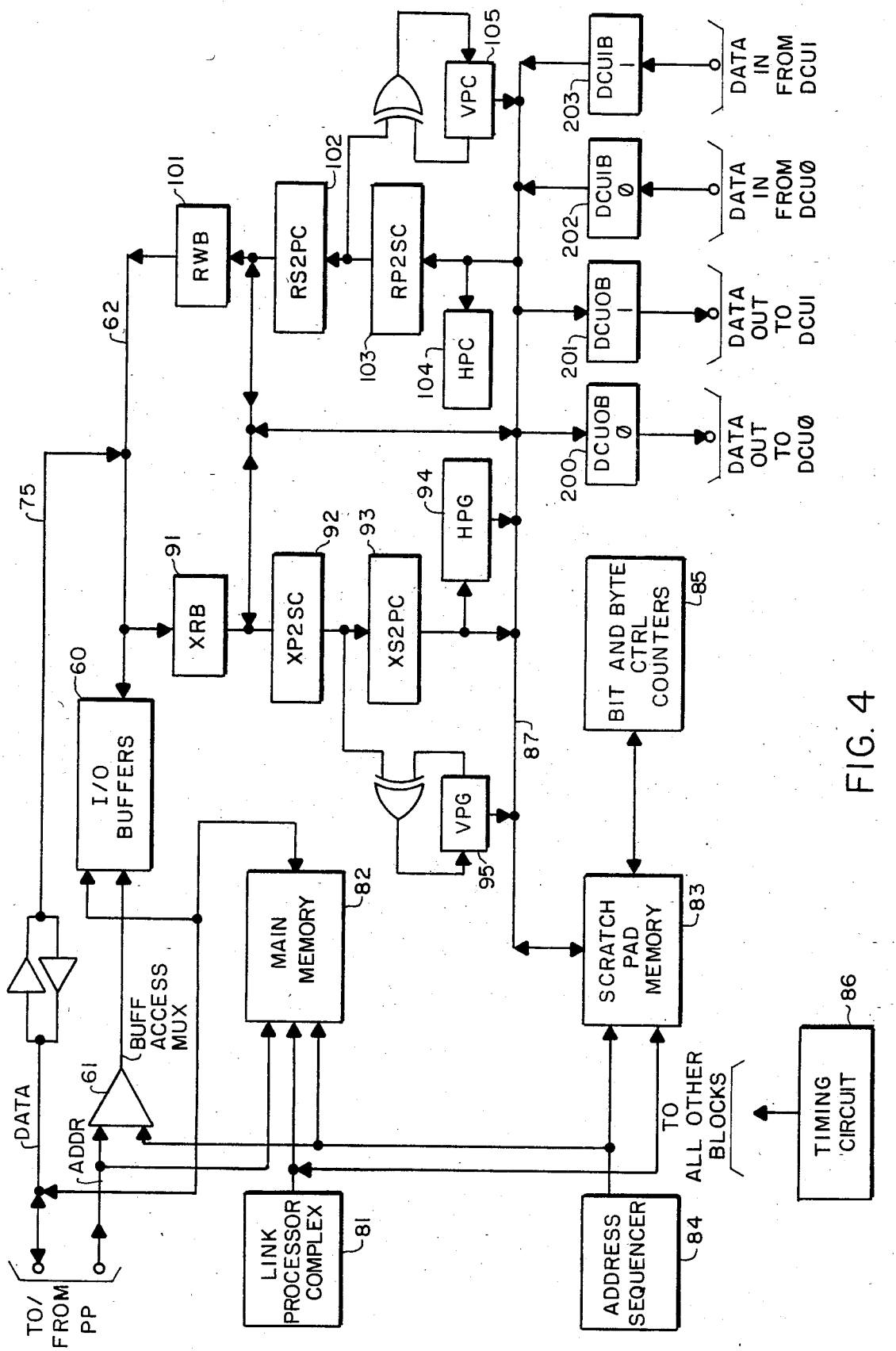
FIG. 4 is a detailed block diagram of the remote data link controller including the receive reformatter of the present invention.

Turning now to FIG. 4, a block diagram of the Data Link Processor and control 80, 80' of RDLC 100 is shown. The link processor complex 81 includes an Intel 8085A microprocessor together with associated read only memory (ROM), address and data latches and timing and control circuitry. The processor under control of the program in ROM simply controls the operation of the RDLC. Main memory 82 is a 256×8 bipolar random access memory (RAM) arranged for shared access by the link processor complex 81, the peripheral processor (PP) and the address sequencer 84. The link processor complex 81 uses main memory 82 as its primary read/write memory. The PP uses it for a status and control function.

Both the PP and the address sequencer 84 do a prefetch of a 2-bit page address from the main memory 82 prior to accessing the I/O buffers 60. This page address is used to identify which of the four buffers associated with a single data link will actually be accessed during the I/O buffer access.

Buffer access multiplexers 61 are a set of multiplexers and tri-state drivers which allow the RDLC hardware to share access to the I/O buffers 60 with software access from the PP. The I/O buffers 60 are a 1K random access memory (RAM) containing the four transmit and the four receive message buffers for each of the 16 data links.

Intermediate data is stored in scratch pad memory 83 with which is addressed by counters in address sequencer 84. Address sequencer 84 also provides control hardware sequencing to the rest of the RDLC. Bit and byte control counters 85 determine which bit of which byte is actually being processed at any given instant by the transmit formatter and receive reformatter.

The transmit formatter comprises elements 91 through 95 and is the circuitry that takes the 8-bit bytes from the I/O buffer 60 transmit buffers and converts them to the 7-bit plus parity format that is transmitted. The receive reformatter elements 101 through 105 is the circuitry that takes the in-coming data and converts it back into the 8-bit bytes placed into the receive buffers of I/O buffer 60.

The timing circuit 86 is a read only memory driven, finite state machine arranged to generate periodic signals used for timing and synchronization within the RDLC.

Figure 5:
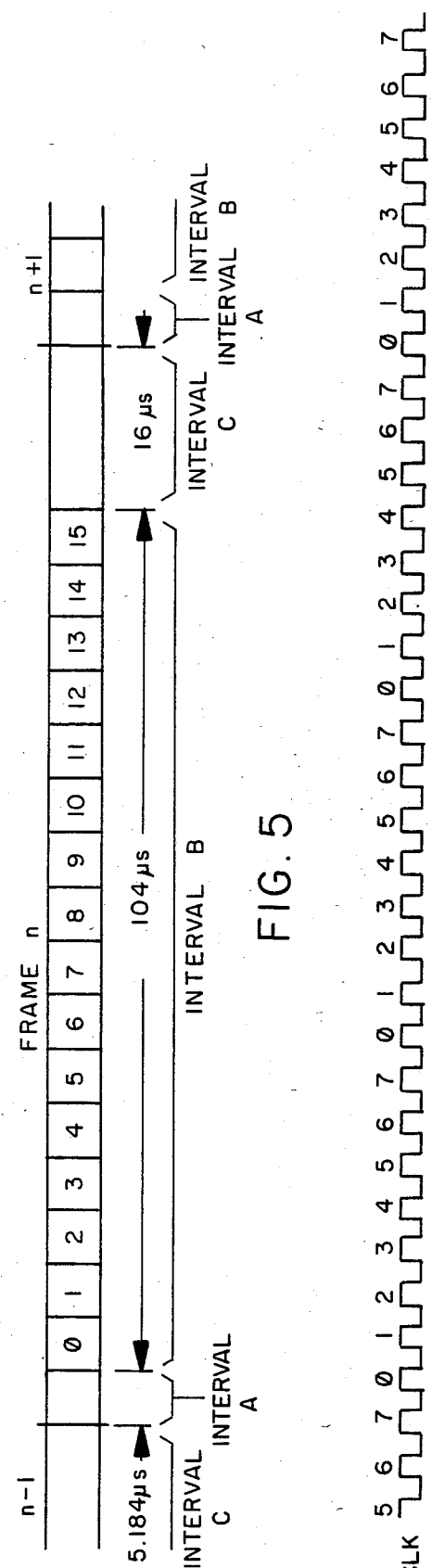
FIG. 5 is a detailed time utilization diagram of the remote data link channel represented in FIG. 2.

Turning now to FIG. 5, the overall timing that repeats for every frame is shown. As can be seen the frame is divided into three intervals. Interval A, interval B and interval C. During interval A, the RDLC devotes all resources to the task of transferring data to and from the DCUs. Data for all 16 data links is exchanged during this 5.184 microsecond interval. No processing of data occurs during this time, however the peripheral processor may access the I/O buffer 60 or the main memory 82 for status information. During interval B, the RDLC devotes its time to processing data; handling link 0, then link 1 and so on for all 16 links. Within each frame, each link handles one transmit and one receive data byte. The RDLC takes 6.48 microseconds to process both transmit and receive data for one link, requiring about 104 microseconds for all 16 links. During interval C, the RDLC reformatters do nothing except wait for the beginning of the next frame. This waiting period lasts approximately 16 microseconds. Therefore, the entire RDLC channel within each frame lasts approximately 125 microseconds.

Figure 6:
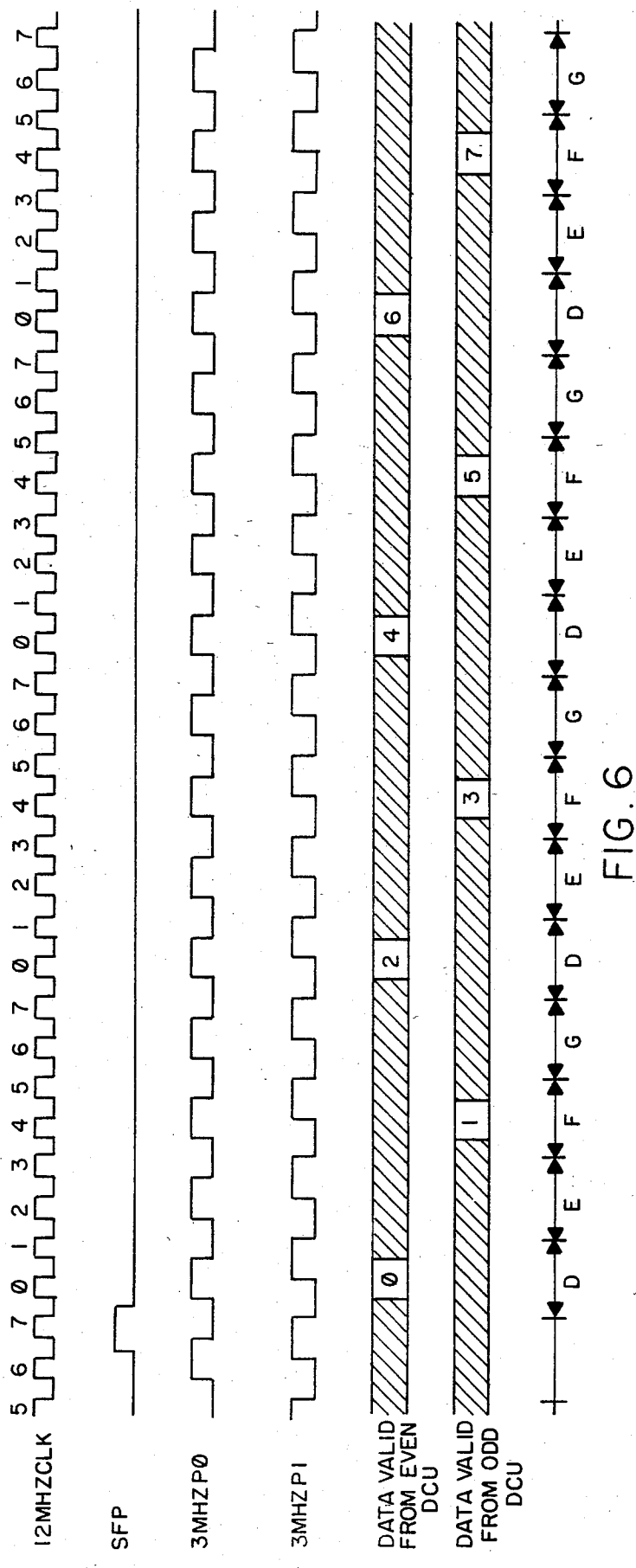
FIG. 6 is a remote data link controller transfer timing diagram.

Turning to FIG. 6 and FIG. 4, a closer look at the timing during interval A is shown. During interval D, data is valid from the even DCU and is transferred to the even DCU input buffer (DCUIB) 202. Simultaneously, a read access to the scratch pad memory 83 extracts the next output byte which is transferred to the even DCU output buffer (DCUOB) 200. During interval E, a received input byte from the even DCU input buffer DCUIB 202 is transferred to the scratch pad memory 83 for the appropriate data link. Simultaneously, the odd DCU will extract data from a DCU output buffer DCUOB 200 in preparation for transmitting it. During interval F, a transmitter output byte is transferred from the scratch pad memory 83 to the odd DCU output buffer DCUOB 200. Simultaneously, data is transferred from the odd DCU into the associated odd DCU input buffer DCUIB 203. During interval G, the even DCU takes data from its associated DCU output buffer DCUOB 200 in preparation for transmitting it. Simultaneously, a receive input byte from the odd DCU input buffer DCUIB 203 is transferred into the scratch pad memory 83.

Much of the activity on the RDLC takes place during the reformatting interval (Interval B). This interval is divided into 16 reformatting cycles. During each reformatting cycle, one byte of transmit data and one byte of received data is reformatted for one data link. During the 16 cycles data for each of the 16 data links is processed one data link per cycle. Therefore, the RDLC processes one transmit and one receive message byte per reformatting cycle for one data link. It stores any intermediate results in the scratch pad memory 83 and then proceeds to serve the next data link. Fetching intermediate results from the scratch pad memory, processing the data, and storing the next intermediate results and so on until the RDLC has served all 16 data links. The scratch pad memory 83 therefore provides storage for the transient state information (intermediate results) that is necessary to keep track of what each of the individual data links is doing. This information is updated once every frame or 125 microseconds.

With renewed reference to FIG. 4, a general operating explanation will be given for the receive reformatter. Data from the T1 carrier is stored in the DCU input buffer (DUCIB) from which it is transferred to the scratch pad memory 83 via scratch pad bus 87. At the appropriate time this data is transferred to the receiver parallel to serial converter RP2SC 103. Horizontal parity checks and vertical parity checks are performed by the horizontal parity checker (HPC) 104 and the vertical parity checker (VPC) 105 before the data is transferred to the receiver serial to parallel converter RS2PC 102.

When eight data bits are accumulated in the RS2PC 102 they are transferred to the receive write buffer (RWB) 101 and then into the I/O buffer 60 over I/O buffer bus 62. The RWB 101 provides an asynchronous interface between I/O buffer 60 and the receive reformatter. The receive bit counter in the bit and byte control counter 85 keeps track of the number of data bits in RS2PC 102.

Figure 7:
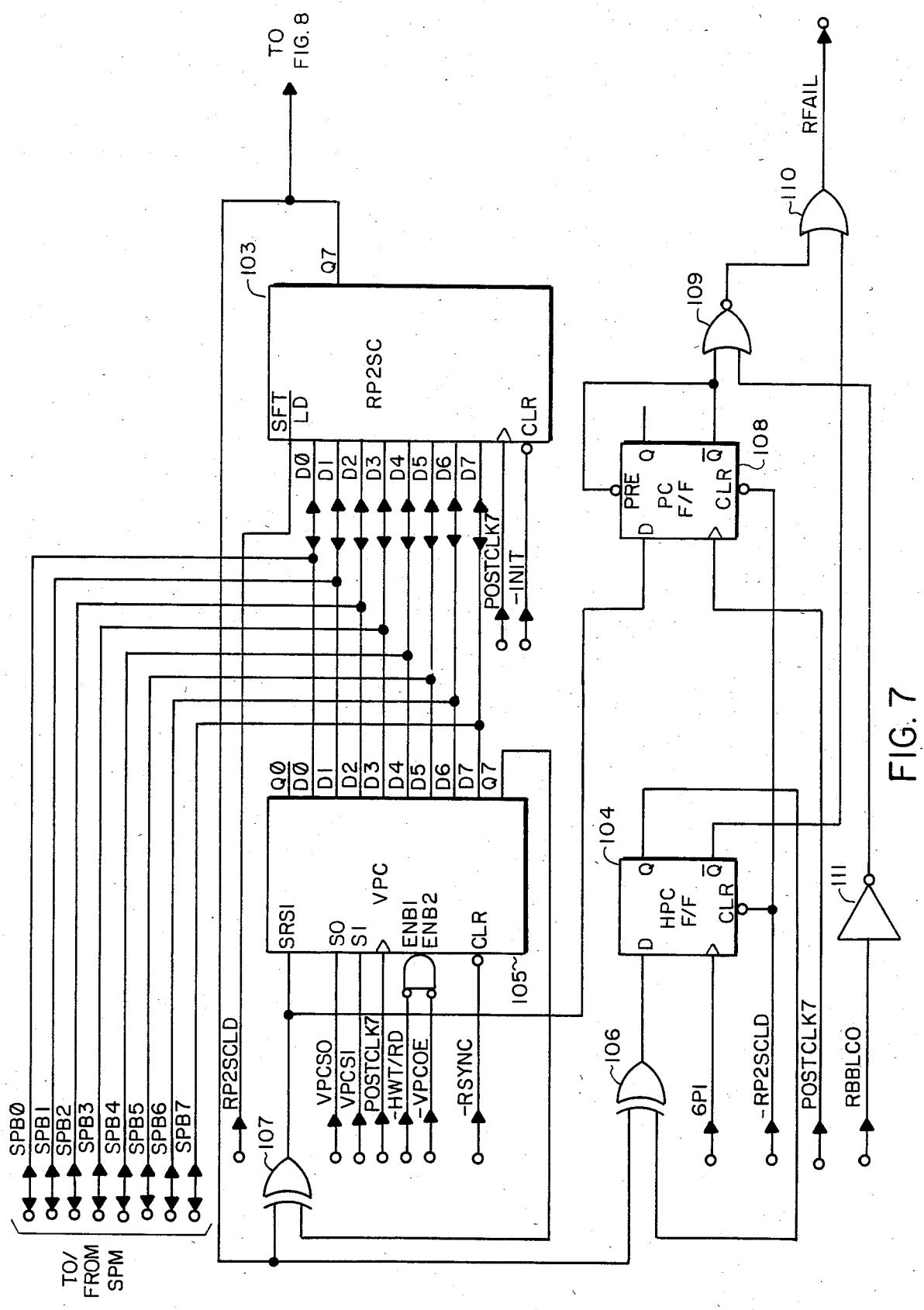
FIG. 7 is a first schematic drawing of the remote data link controller receive reformatting circuit of the present invention.
Figure 8:
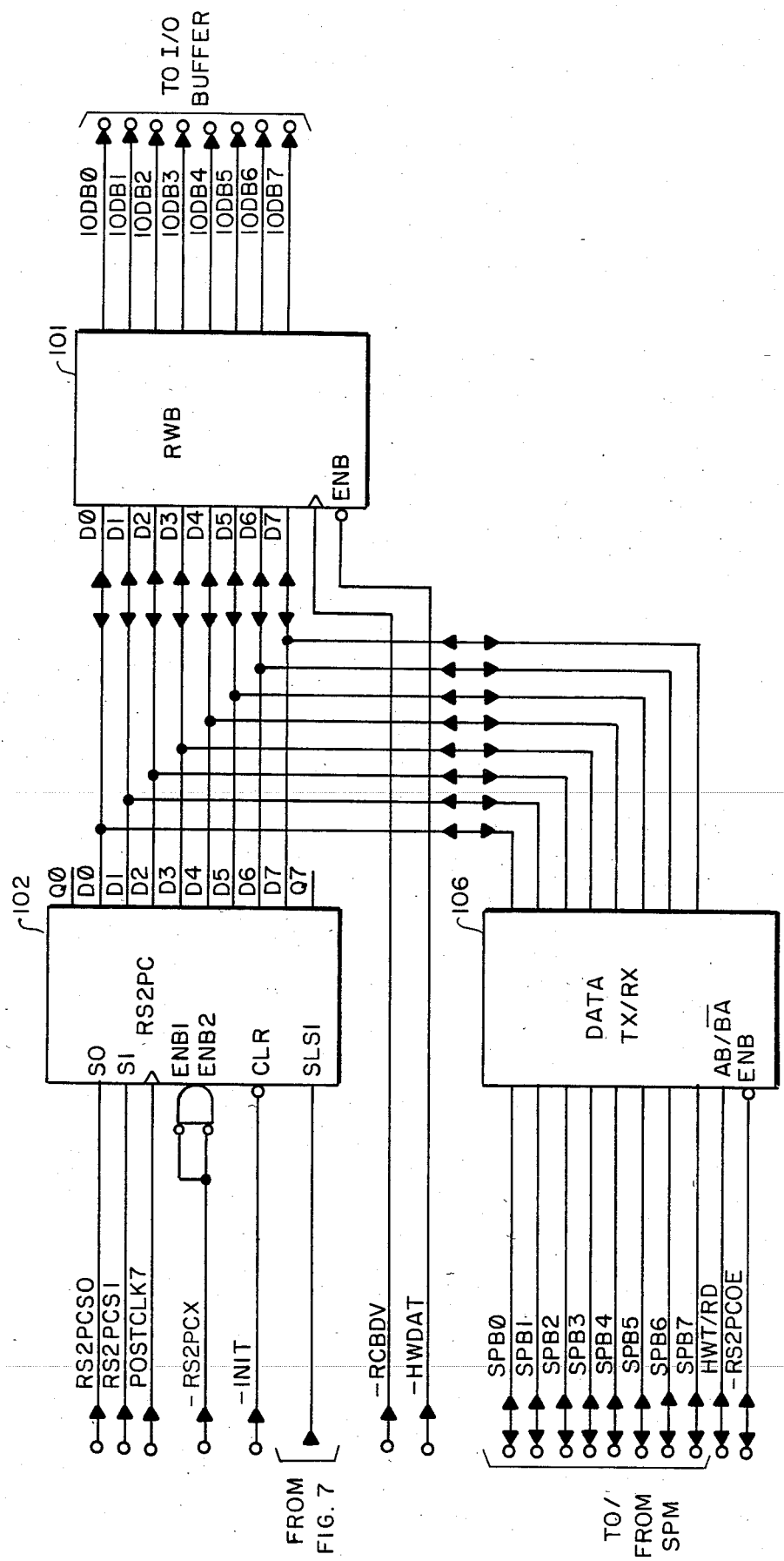
FIG. 8 is a second schematic drawing of the remote data link controller receive data reformatter of the present invention.

Turning now to FIG. 7 and FIG. 8, a detailed schematic of the receiver reformatter of the present invention is shown. The receiver reformatter is comprised of a receiver parallel to serial converter (RP2SC) 103 a vertical parity checker (VPC) 105, a horizontal parity checker 104, a receiver serial to parallel converter (RS2PC) 102, a data transceiver (TX/RX) 106 and a receive write buffer (RWB) 101. RP2SC 103 and VPC 105 are connected to scratch pad memory 83 via a scratch pad memory bus 87 (FIG. 4) comprised of bidirectional bus lines SPB0–SPB7. The serial output of RP2SC 103 is applied to the SRSI input of VPC 105 via exclusive-OR gate 107. The serial output of RP2SC 103 is also applied to the D input of HPC 104 via exclusive-OR gate 106. Finally, the serial output of RP2SC 103 is applied to the SLSI input of RS2PC 102. RS2PC 102 converts the serial data into parallel data which it outputs from its D0–D7 lines to RWB 101. RWB 101 temporarily stores the reformatted data byte which is then output to the I/O buffer 60 via I/O data buffer bus 62 (FIG. 4) comprised of unidirectional bus lines IODB-0–IODB7.

TX/RX 106 is connected to the scratch pad memory 83 via scratch pad bus lines SPB0–SPB7 and also to data lines D0–D7 of RS2PC 102 and RWB 101. TX/RX 106 allows the loading of RS2PC 102 with a partially received data byte from a previous reformatting cycle stored in the scratch pad memory 83 and also the unloading of a partially reformatted data byte to the scratch pad memory 83 at the end of the current reformatting cycle.

VPC 105 and RS2PC 102 are each implemented with an 8-bit universal shift register and RP2SC with an 8-bit parallel/serial synchronous loading shift register. RWB 101 is implemented with an octal edge-triggered D-type flip-flop and TX/RX 106 with an octal bus transceiver.

With renewed reference to FIG. 7 and FIG. 8 and also to FIG. 9, a detailed explanation of the operation of the receiver reformatter of the present invention will be given. At the beginning of each reformatting cycle a received data byte is transferred from the scratch pad memory 83 via lines SPB0–SPB7 to RP2SC 103. The received data byte presented on inputs D0–D7 of RP2SC 103 is loaded when control signal RP2SCLD is a logic low.

Next a partially computed check sum is transferred from the scratch pad memory 83 via bus lines SPB0–SPB7 to the D0–D7 inputs of VPC 105. VPC 105 is enabled by control signals —HWT/RD and —VPCOE. These control signals which are produced in other parts of the RDLC circuit enable VPC 105 when they are both logic low. Data presented on the D0–D7 inputs of VPC 105 is loaded into VPC 105 when control signals VPCS0 and VPCS1 are both logic high.

A partially reformatted data byte is transferred from scratch pad memory 83 via bus lines SPB0–SPB7 and TX/RX 106 to RS2PC 102. Transceiver 106 allows data to be loaded into RS2PC 102 when control signals HWT/RD and —RS2PCOE are both logic low. RS2PC 102 is enabled when signal RS2PCX is logic low and the data present on lines D0–D7 is transferred into RS2PC 102 when control signals RS2PCS0 and RS2PCS1 are both logic high.

After the loading of RS2PC 102 the contents of RP2SC 103 is shifted seven or eight bits via clock signal POSTCLK 7 and output through line Q7. The output serial data is applied to gate 107 and to the SLSI input of RS2PC 102. As each bit is applied to gate 107 it is exclusive-ORed with check sum in VPC 105 and re-entered via the SRSI input.

When a complete message has been received the check sum in VPC 105 should contain all zeros. Parity check circuit (PC) 108 checks for this condition. Verticle parity failures are transmitted to the peripheral processor via line RFAIL and gates 109 and 110.

The serial data output of RP2SC 103 is also applied to gate 106 and to the D input of HPC 104. The Q output of HPC 104 is exclusive-ORed with the serial input at gate 106 and applied to the D input of HPC 104. Horizontal parity failures clear bit and byte counters 85 via gate 110 and signal RFAIL.

Shifting of the serial data into VPC 105 occurs when VPCS0 is logic high and VPCS1 is logic low. The data is shifted in by clock signal POSTCLK 7.

The data shifted out of RP2SC 103 is applied to RS2PC 102 at the SLSI input. Data is transferred out of RS2PC 102 when control lines RS2PCS0 and RS2PCS1 are logic low and high respectively and enable line —RS2PCX is high. A complete data byte is output to RWB 101 via data lines D0–D7 and latched by control signals —RCBOV and —HWDAT. It should be noted, that since RS2PC 102 may have contained data from a previous reformatting cycle RWB 101 may contain a complete data byte after only seven data bits have been transferred out of RP2SC 103. In any event, RP2SC 103 transfers all its data bits and normally remains empty at the end of a reformatting cycle.

Data left over in RS2PC 102 at the end of a reformatting cycle is transferred to scratch pad memory 83 via lines D0–D7, TX/RX 106 and bus lines SPB0–SPB7. The partially reformatted data byte is transferred to the scratch pad memory 83 when control signals HWT/RD and —RS2PCOE of TX/RX 106 are low and high respectively.

Any partially computed check sum remaining in VPC 105 is also transferred to scratch pad memory 83 via VPC 105, lines D0–D7 and bus lines SPB0–SPB7. The contents of VPC 105 are shifted out when —HWT/RD and —VPCOE are logic high and low respectively.

The reformatted data byte in RWB 101 is written into the proper receive location in the I/O buffer 60. The RWB provides an asynchronous interface between I/O Buffer 60 and RS2PC 102. This ensures that a reformatted data byte is always immediately available to the PP.

In this manner one byte of data is received and reformatted. This process repeats 16 times, once for each data link until 16 bytes of data have been received. This process requires just under 104 microseconds Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunications switching system, a receive data reformatter for disassembling a data message containing a plurality of message bytes, each message byte having seven data bits and a parity bit into a plurality of 8-bit data bytes, said telecommunications switching system including a peripheral processor, connected an input buffer, said input buffer arranged to receive and store said 8-bit data bytes from said receive data reformatter and a temporary memory, said receive data reformatter comprising:
   a parallel to serial converter connected to said temporary memory arranged to receive a message byte from said temporary memory in parallel form and output said message byte serially;
   a horizontal parity check circuit connected to said parallel to serial converter output arranged to receive said parallel to serial converter serial message byte and output an error signal to said peripheral processor responsive to an error in parity;
   a serial to parallel converter connected to said parallel to serial converter serial output arranged to receive the output serial message byte from parallel to serial converter and assemble said serial message byte into parallel form; and
   a write buffer connected to said serial to parallel converter output arranged to receive a parallel data byte when eight data bits have been assembled in said serial to parallel converter whereby, said write buffer transfers said data byte to said input buffer making said data byte available to said peripheral processor.

2. The receive data reformatter as claimed in claim 1, wherein: said receive reformatter further includes a vertical parity check circuit having an input connected to said serial output of said parallel to serial converter and said vertical parity check circuit receives said serial data shifted out of said parallel to serial converter developing a vertical parity check sum and said vertical parity check circuit further includes an output connected to said temporary memory whereby, said check sum is stored in said temporary memory each time a data byte is transferred to said input buffer.

3. The receive data reformatter as claimed in claim 2, wherein: said serial to parallel converter is connected to said temporary memory and said receive reformatter processes one byte of said plurality of message bytes at a time and any data bits remaining in said serial to parallel converter after one complete data byte has been assembled is transferred to said temporary memory.

4. The receive data reformatter as claimed in claim 3, wherein: said remaining bits transferred to said temporary memory are returned to said serial to parallel converter and a second message byte is loaded into said parallel to serial converter from said temporary memory, said parallel to serial converter outputting said second message byte serially to said serial to parallel converter whereby, a second data byte is assembled and transferred to said write buffer.

5. The receive data reformatter as claimed in claim 4, wherein: said parallel to serial converter outputs serially all of the bits of said second data message to said serial to parallel converter and all of the bits remaining in said serial to parallel converter after the second data byte has been assembled is transferred to said temporary memory.

6. The receive data reformatter as claimed in claim 4, wherein: said check sum stored in said temporary memory is returned to said vertical parity check circuit and said serial bits from said second data byte are input into said parity check circuit whereby, a new check sum is developed after a second data byte has been assembled.

7. The receive data reformatter as claimed in claim 4, wherein: said data message is comprised of ten message bytes and a vertical parity byte and said vertical parity byte is disposed at the end of said data message whereby, said vertical parity byte is input into said vertical parity check circuit and said vertical parity check circuit produces an error signal when an error in vertical parity is detected.

8. The receive data reformatter as claimed in claim 7, wherein: said ten message bytes contain 64 bits of data, a first message byte having one of said 64 bits of data and the remaining message bytes containing said 63 bits of data, each message byte containing seven bits of said 63 bits, whereby said receive data reformatter assemblies said data message into eight of said 8-bit data bytes.

* * * * *